(12) United States Patent
Chien et al.

(10) Patent No.: US 10,394,351 B2
(45) Date of Patent: Aug. 27, 2019

(54) DISPLAY DEVICE (71) Applicant: InnoLux Corporation, Miao-Li County (TW)

(72) Inventors: Lien-Chen Chien, Miao-Li County (TW); Shih-Yuan Feng, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/401,352

(22) Filed: Jan. 9, 2017

(65) Prior Publication Data

US 2017/0199592 A1 Jul. 13, 2017

(30) Foreign Application Priority Data

Jan. 13, 2016 (CN) .................... 2016 2 0028543 U (51) Int. Cl.
*G06F 3/041* (2006.01)
*G06F 1/16* (2006.01)
*G06F 3/147* (2006.01)

(52) U.S. Cl.
CPC ............ *G06F 3/041* (2013.01); *G06F 1/1601* (2013.01); *G06F 1/1603* (2013.01); *G06F 3/147* (2013.01); *G06F 2200/1612* (2013.01)

(58) Field of Classification Search
USPC .......... 345/87, 173, 174, 205, 206; 361/718, 361/752; 455/566; 349/58, 62; 348/725; 362/602; 248/371
See application file for complete search history.

(56) References Cited

U.S. PATENT DOCUMENTS

| | | | | |
|---|---|---|---|---|
| 6,065,732 A * | 5/2000 | Cho | ...................... | G06F 1/1616 248/371 |
| 2008/0018824 A1* | 1/2008 | Sawa | ................ | G02F 1/133308 349/58 |
| 2009/0140963 A1* | 6/2009 | Okumura | ................. | H05K 5/02 345/87 |
| 2009/0213293 A1* | 8/2009 | Sekiguchi | ......... | G02F 1/133608 349/58 |
| 2011/0069250 A1* | 3/2011 | Ota | .................... | G02F 1/133608 349/62 |
| 2012/0071207 A1* | 3/2012 | Yoo | ........................ | G06F 1/1626 455/566 |
| 2012/0170223 A1* | 7/2012 | Yoon | .................. | H05K 7/20963 361/718 |
| 2013/0016524 A1* | 1/2013 | Momose | ........... | G02F 1/133308 362/602 |
| 2013/0094160 A1* | 4/2013 | Narumi | ............. | G02F 1/133308 361/752 |

(Continued)

*Primary Examiner* — Thuy N Pardo (74) *Attorney, Agent, or Firm* — Muncy, Geissler, Olds & Lowe, P.C.

(57) ABSTRACT

A display device includes a display module, a connecting circuit board, and a side frame. The display module has a display panel and a frame housing. The frame housing supports the display panel and has a first side. A surface of the first side is configured with a recess. The connecting circuit board is disposed corresponding to the recess. The connecting circuit board is connected to the display panel and passes through the recess. The side frame is disposed at the first side and connected to the frame housing. The side frame covers the connecting circuit board, the recess and the first side.

10 Claims, 8 Drawing Sheets

(56) References Cited

U.S. PATENT DOCUMENTS

| | | | | |
|---|---|---|---|---|
| 2014/0286053 | A1* | 9/2014 | Momose | G02F 1/133308 362/633 |
| 2014/0362325 | A1* | 12/2014 | Lee | G02F 1/133308 349/58 |
| 2015/0186097 | A1* | 7/2015 | Hall | G06F 3/1446 345/1.3 |
| 2015/0226996 | A1* | 8/2015 | Ohashi | G02B 6/0011 348/725 |
| 2015/0331451 | A1* | 11/2015 | Shin | G06F 3/041 345/173 |
| 2015/0334211 | A1* | 11/2015 | Shin | G06F 3/041 455/566 |
| 2016/0004355 | A1* | 1/2016 | Zadesky | G06F 1/1613 345/174 |
| 2018/0181163 | A1* | 6/2018 | Shin | G06F 3/041 345/173 |

\* cited by examiner

DISPLAY DEVICE

CROSS REFERENCE TO RELATED APPLICATIONS

This Non-provisional application claims priority under 35 U.S.C. § 119(a) on Patent Application No(s). 201620028543.9 filed in People's Republic of China on Jan. 13, 2016, the entire contents of which are hereby incorporated by reference.

BACKGROUND

Technical Field

The present disclosure relates to a display device and, in particular, to a flat display device.

Related Art

As the progress of technology, the flat display device has been widely applied to various fields. In particular, the liquid crystal display (LCD) device or the organic light-emitting diode (OLED) display device has the advantages of light, thin, low power consumption, and no radiation, so it gradually replaces the traditional CRT display device. The LCD device and OLED display device can be applied to many electronic devices such as mobile phone, portable multimedia device, laptop computer, LCD TV and LCD monitor.

The LCD device mainly includes a display panel and a backlight module, which are disposed opposite to each other. The backlight module emits light, which passes through the display panel, and a control circuit board is connected to the display panel through a connecting circuit board. The control circuit board can output control signals to control a plurality of pixels of the display panel, so that the pixels of the display panel can emit the desired colors so as to display an image.

In order to protect the display device from the moisture or dusts, the conventional art is to provide a protection element (e.g. a protection glass) on the display module. Besides, the conventional art also utilizes the recess of the frame housing, which supports the display panel, to accommodate the connecting circuit board, so that the control circuit board connecting to the connecting circuit board can be disposed at the rear side of the display module. However, the frame housing with the recess will provide a smaller surface for bonding to the protection element, which results in the worse strength and planarity of the bonded frame housing and protection element.

Therefore, it is desired to provide a display device having better strength and planarity of the bonded protection element and higher reliability.

SUMMARY

An objective of the present disclosure is to provide a display device having better strength and planarity of the bonded protection element and higher reliability.

To achieve the above objective, a display device includes a display module, a connecting circuit board and a side frame. The display module has a display panel and a frame housing, and the frame housing supports the display panel and has a first side configured with a recess. The connecting circuit board is disposed corresponding to the recess, and the side frame is disposed at the first side and connected to the frame housing. The connecting circuit board is connected to the display panel and passes through the recess, and the side frame covers the connecting circuit board, the recess and the first side.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1A:
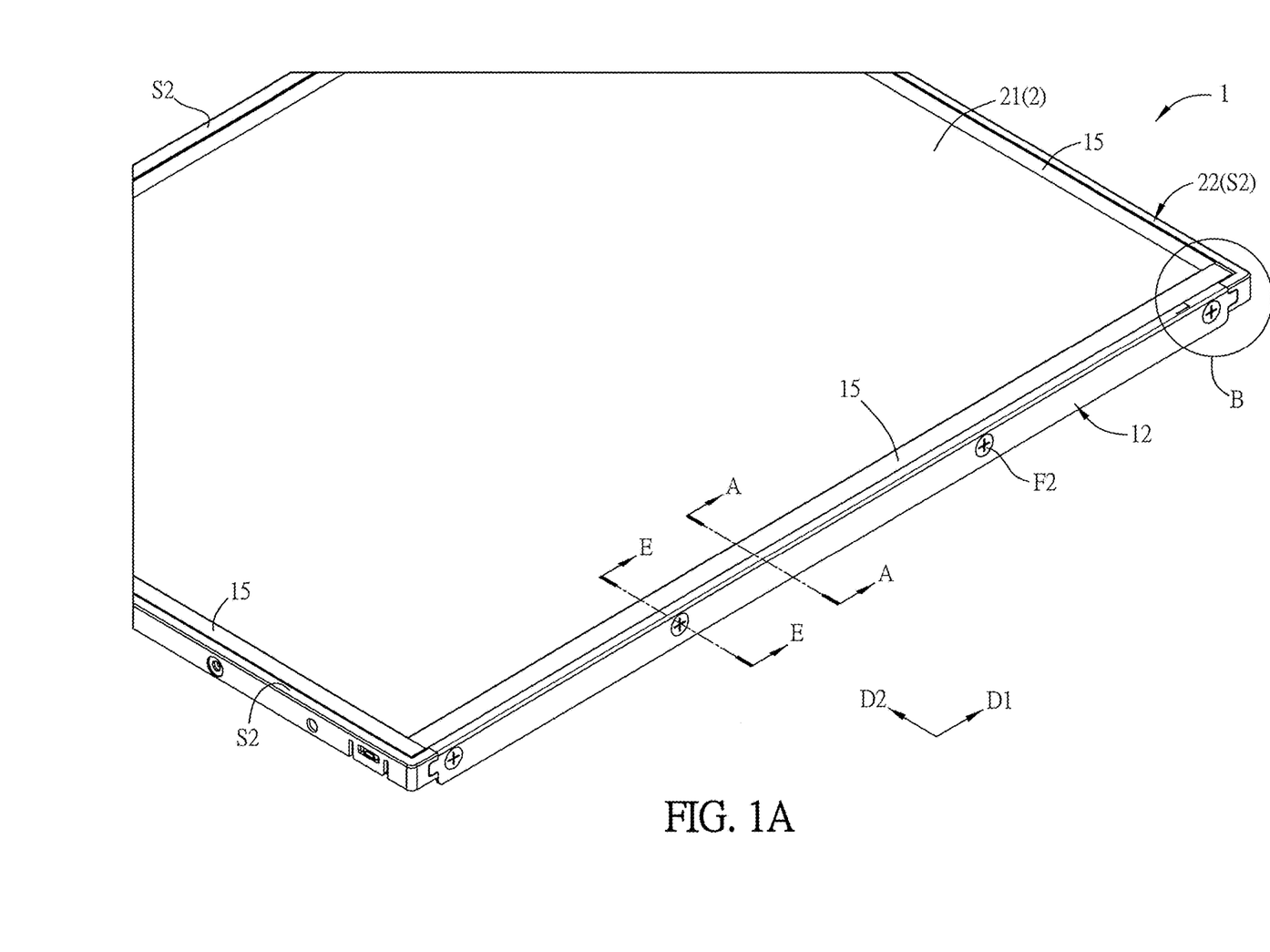
FIG. 1A is a schematic diagram showing an assembled display device according to an embodiment of the disclosure.
Figure 1B:
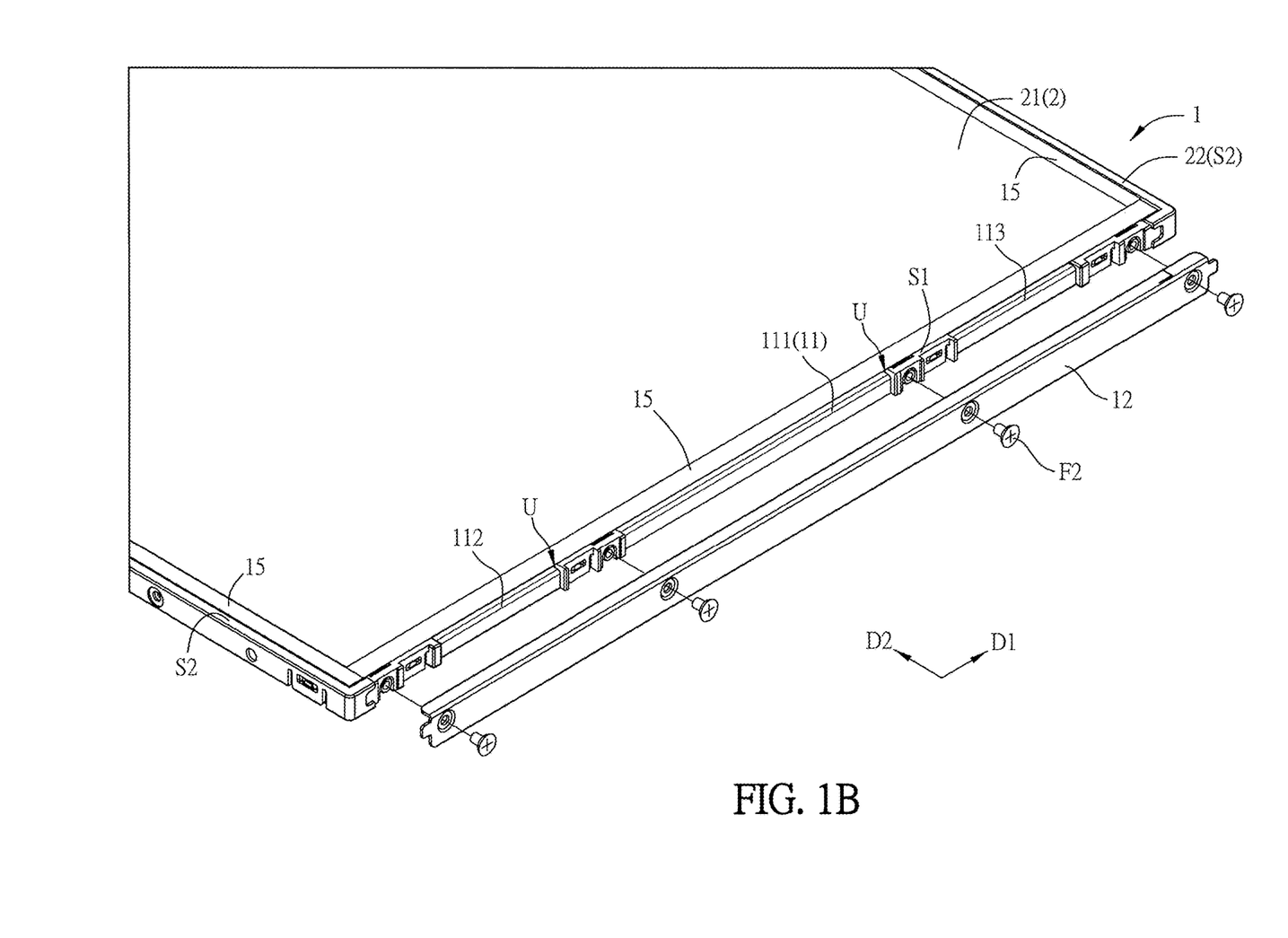
FIG. 1B is an exploded view of the display device according to the embodiment of the disclosure.
Figure 1C:
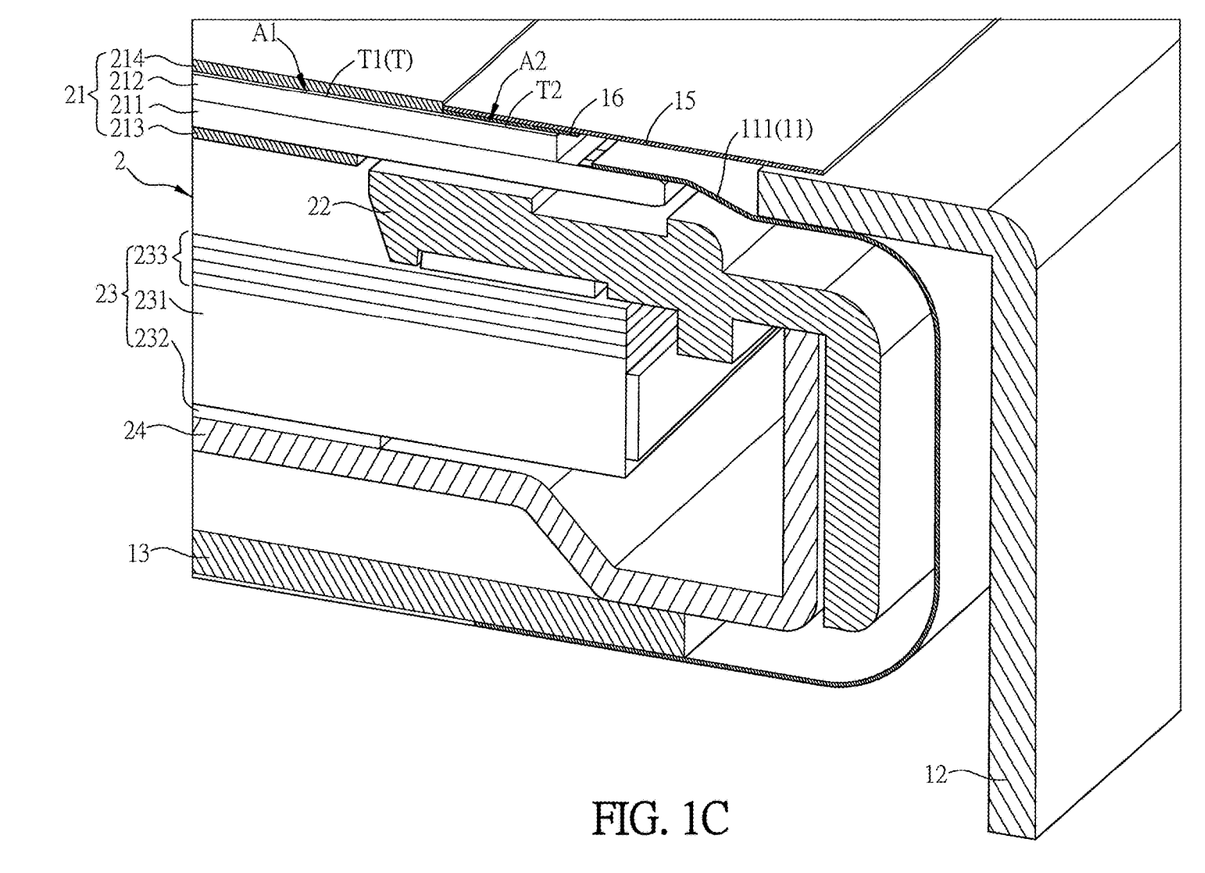
FIG. 1C is a sectional view of the display device of FIG. 1A along the line A-A.
Figure 1D:
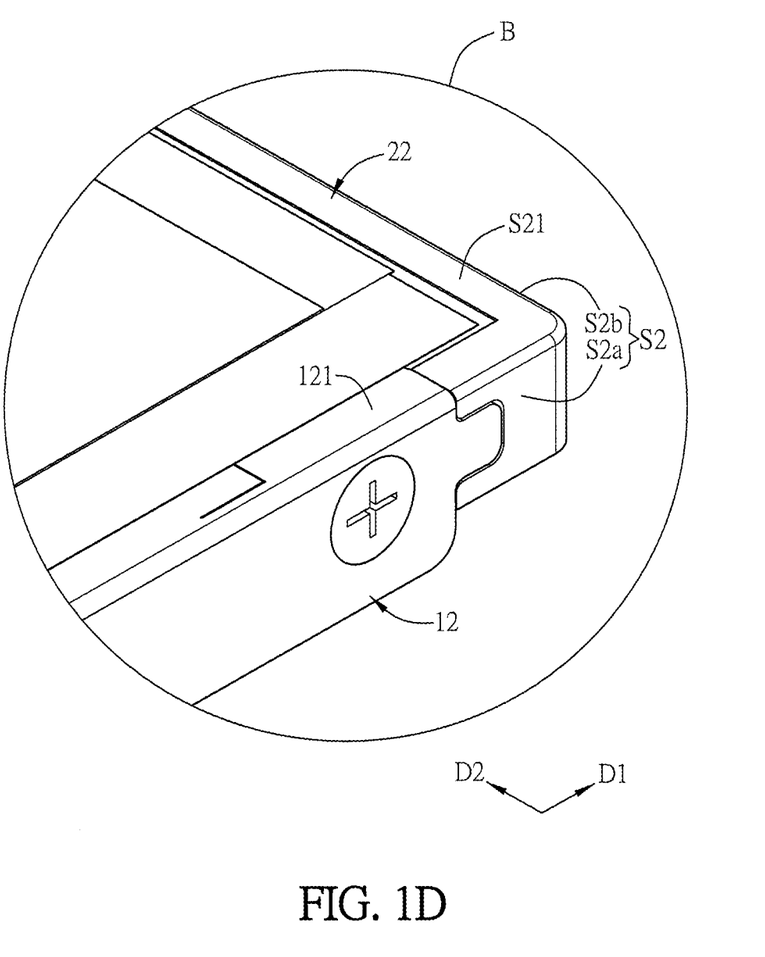
FIG. 1D is an enlarge view of the area B of the display device of FIG. 1A.
Figure 1E:
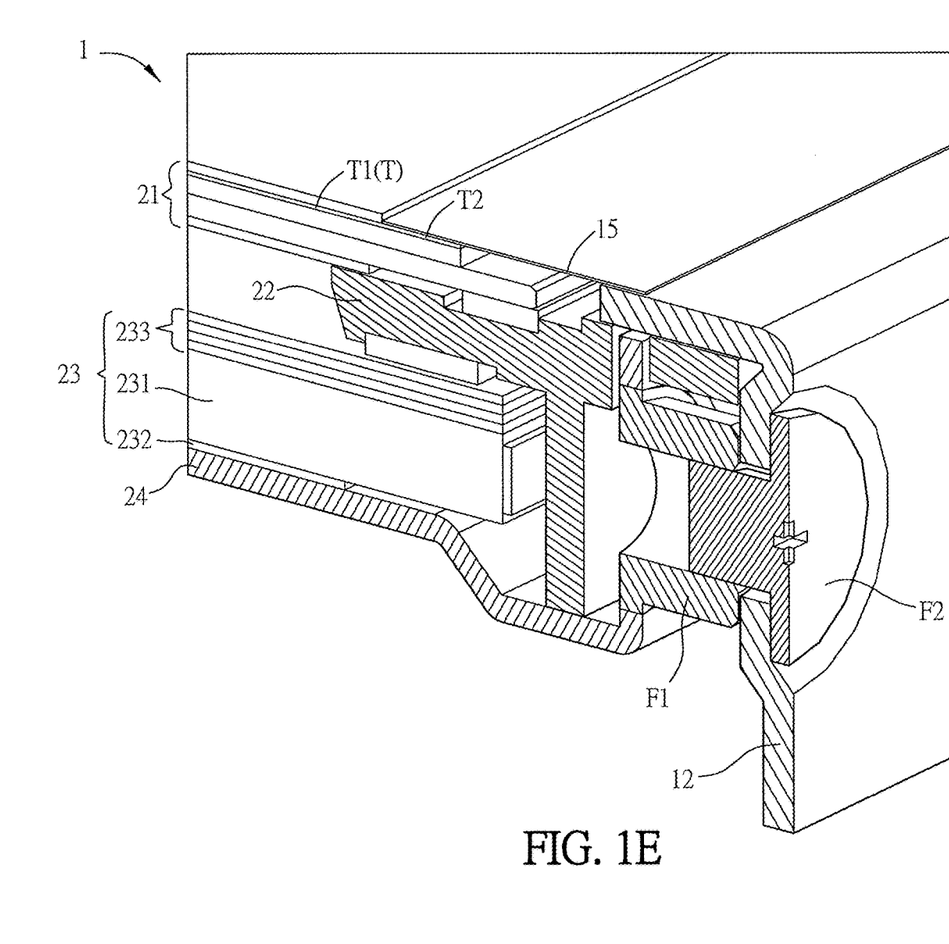
FIG. 1E is a sectional view of the display device of FIG. 1A along the line E-E.

FIG. 1A is a schematic diagram showing a display device 1 according to an embodiment of the disclosure. FIG. 1B is an exploded view of the display device 1 according to the embodiment of the disclosure. FIG. 1C is a sectional view of the display device 1 of FIG. 1A along the line A-A. FIG. 1D is an enlarge view of the area B of the display device 1 of FIG. 1A. FIG. 1E is a sectional view of the display device 1 of FIG. 1A along the line E-E.

As shown in FIGS. 1A and 1B, the display device 1 includes a display module 2, a connecting circuit board 11 and a side frame 12. The display device 1 can be an LCD device or an OLED display device. In this embodiment, the display device 1 is an LCD device such as an IPS (In-plane switch) LCD device, an FFS (Fringe Field Switching) LCD device, a TN (Twisted Nematic) LCD device, or a VA mode (Vertical Alignment mode) LCD device, and this invention is not limited.

The display module 2 includes a display panel 21 and a frame housing 22. The frame housing 22 supports the display panel 21. As shown in FIG. 1C, the display panel 21 includes a first substrate 211, a second substrate 212, and a display medium layer (not shown). The first substrate 211 is disposed opposite to the second substrate 212, and the display medium layer is disposed between the first substrate 211 and the second substrate 212. The first substrate 211 and the second substrate 212 can be made of transparent material, such as a glass substrate, a quartz substrate or a plastic substrate, and this invention is not limited. In this embodiment, the first substrate 211 can be a thin film transistor (TFT) substrate, and the second substrate 212 can be a color filter (CF) substrate. Alternatively, in other embodiments, the black matrix or the filter layer of the CF substrate can be formed on the TFT substrate, so that the first substrate 211 becomes a BOA (BM on array) substrate or a COA (color filter on array) substrate. To be noted, this disclosure is not limited thereto. In another embodiment, the display device 1 can be an OLED display device, so the display medium layer is an OLED layer. In one aspect, if the OLED layer emits a white light, the second substrate 212 can be a CF substrate. In another aspect, if the OLED layer emits a red, green or blue light, the second substrate 212 can be a cover plate for protecting the OLED layer from the external moisture or dusts.

The display panel 21 may further includes two polarizers 213 and 214. The polarizer 213 is a lower polarizer, and the polarizer 214 is an upper polarizer. The polarizer 213 (lower polarizer) is disposed on one side of the first substrate 211 away from the second substrate 212, and the polarizer 214 (upper polarizer) is disposed on one side of the second substrate 212 away from the first substrate 211. In this case, the polarizer 213 is disposed on the lower surface of the first substrate 211, and the polarizer 214 is disposed on the top surface of the second substrate 212.

The display module 2 further includes a backlight module 23 and a back plate 24. The display panel 21 is disposed on the frame housing 22 and is located corresponding to the backlight module 23. The back plate 24 supports the display panel 21 and the backlight module 23. The backlight module 23 emits light to the display panel 21, so that the display panel can display images. The backlight module 23 can include a light guiding plate 231, a reflective plate 232, and a plurality of optical films 233. The reflective plate 232 and the optical films 233 are disposed at opposite two sides of the light guiding plate 231. In this embodiment, the backlight module 23 includes four optical films 233, which can be, for example but not limited to, a light collector or diffuser. Since the backlight module 23 is a well-known technology, and any skilled person in this art can understand the relative position with the display panel 21 and the functions of the components thereof, so the detailed description thereof will be omitted. Besides, the back plate 24 can accommodate the display panel 21, the backlight module 23 and the frame housing 22 for providing the protection from impaction, electromagnetic wave, and electric shock. The material of the back plate 24 can be plastic, metal or metal alloy, and this invention is not limited. In this embodiment, the material of the back plate 24 is metal or metal alloy.

Referring to FIGS. 1A and 1B, the frame housing 22 at least has a first side S1, which is configured with at least one recess U. In this embodiment, the first side S1 is configured with three recesses U. Herein, the recesses U are the concave portions of the first side S1 of the frame housing 22 for accommodating the connecting circuit board 11.

The connecting circuit board 11 is located corresponding to the recess U and connected to the display panel 21. In other words, the connecting circuit board 11 extends from the display panel 21 and passes through the recess U. Herein, the connecting circuit board 11 can be connected to the first substrate 211 or the second substrate 212 of the display panel 21, and it can be, for example but not limited to, a flexible print circuit (FPC) board or a chip on film (COF). In this embodiment, the connecting circuit board 11 is an FPC board. Besides, the display device 1 of this embodiment includes three connecting circuit boards 111, 112 and 113 disposed corresponding to three recesses U, respectively. The connecting circuit board 111 can control the display panel 21 and is connected to the first substrate 211 (TFT substrate), and the connecting circuit boards 112 and 113 can be connected to the touch electrodes disposed on the second substrate 212 (CF substrate).

As shown in FIG. 1C, the connecting circuit board 111 (11) is connected to the first substrate 211, extends from the first substrate 211 and across the recess U, and then is folded to the rear side of the back plate 24. The other end of the connecting circuit board 111 (11) is connected to a control circuit board 13, so that the display panel 21 can be controlled by the control circuit board 13 and the connecting circuit board 11. In addition, the display device 1 further includes a touch layer T, for example, touch electrodes, which is configured for providing a touch function. Thus, the display device 1 can function as a touch display device. The touch layer T is disposed on the second substrate 212, so the display device 1 becomes a touch on display (TOD) device. In this embodiment, the touch layer T is located between the polarizer 214 and the second substrate 212.

The touch layer T includes a touch electrode layer T1 and a touch wiring layer T2, which are electrically connected to each other. The touch electrode layer T1 is located within a touch area A1, and the touch wiring layer T2 is located within a non-touch area. The touch wiring layer T2 can be electrically connected to at least one of the connecting circuit boards 111, 112 and 113. For example, the touch wiring layer T2 is electrically connected to the connecting circuit boards 112 and 113. In this case, the connecting circuit boards 112 and 113 are connected to the touch electrode layer T1 via the touch wiring layer T2 disposed on the second substrate 212, extend and across the corresponding recesses U, and then is folded to the rear side of the back plate 24. The other ends of the connecting circuit boards 112 and 113 are connected to the control circuit board 13, so that the touch sensing electrodes of the touch sensing electrode layer T1 can be driven by the control circuit board 13 and the connecting circuit boards 112 and 113. In addition, when the touch sensing electrodes of the touch sensing electrode layer T1 are pressed, they will generate electronic signals, which are transmitted to the control circuit board 13 through the touch wiring layer T2 and the connecting circuit boards 112 and 113. The control circuits for controlling the touch sensing electrode layer T1 and the display panel 21 can be integrated in the control circuit board 13, or they can be disposed in different control circuit boards. This invention is not limited.

The side frame 12 is disposed at the first side S1 and connected to the frame housing 22. The side frame 12 covers the connecting circuit board 11, the recess U and the first side S1 of the frame housing 22. The first side S1 extends along a first direction D1. The material of the side frame 12 can be metal or metal alloy (having electric conductivity), and the side frame 12 can be fixed on the first side S1 of the frame housing 22 by multiple second fixing elements F2 (e.g. screws). In addition, the frame housing 22 may further include three second sides S2. As shown in FIG. 1D, the top surface 121 of the side frame 12 and the top surfaces S21 of the second sides S2 of the frame housing 22 are substantially located on the same plane. In other words, the top surface of the first side S1 of the frame housing 22 is lower than the top surface of the second side S2 of the frame housing 22, so that the side frame 12 can be disposed on the top surface of the first side S1 of the frame housing 22. Herein, the top surface means the surface facing the display panel 21. In addition, the shape of the side frame 12 can be L-shaped, and this invention is not limited. After being disposed and connected to the frame housing 22, the top surface 121 of the side frame 12 and the top surfaces S21 of the second sides S2 of the frame housing 22 are positioned at the same level (the same plane). Thus, this can provide a position for the protection element being adhered afterwards.

In this embodiment, the first side S1 of the frame housing 22 extending along the first direction D1 can be not completely covered by the side frame 12. For example, the second sides S2 of the frame housing 22 located at two edges of the side frame 12 can be in the form of a turning structure, for example, an L-shape. In other words, the second side S2 includes a first sub-side S2a located at the edge of the first side S1 and extending along the first direction D1, and a second sub-side S2b connecting to the first sub-side S2a and extending along a second direction D2. The first direction D1 and the second direction D2 can be perpendicular to each other, but this invention is not limited thereto. A turning portion is formed between the first sub-side S2a and the second sub-side S2b. Accordingly, the top surface S21 of the second side includes the top surfaces of the first sub-side S2a, the second sub-side S2b and the turning portion.

In some embodiments, the side frame 12 may cover all sides of the frame housing 22 along the first direction D1. That is, the second sides S2 of the frame housing 22 located at two edges of the side frame 12 only contain the second sub-side S2b along the second direction D2, but do not include the first sub-side S2a and the turning portion.

In addition, the display device 1 may further include a shielding element 15 disposed at peripheries of the display panel 21 and the side frame 12, and the peripheries of the display panel 21 and the frame housing 22. For example, the shielding element 15 is a light shielding tape having a black color, which is attached on the second substrate 212 and located on the same side with the polarizer 214. The configuration of the shielding element 15 can prevent the light emitted by the backlight module 23 from leaking through the part between the display panel 21 and the side frame 12 or the part between the display panel 21 and the frame housing 22. Besides, the shielding element 15 can further enhance the connection strength between the display panel 21 and the side frame 12 and between the display panel 21 and the frame housing 22. In addition, the shielding element 15 of this embodiment may contain a conductive material so that it has electric conductivity. For example, the shielding element 15 can be made of aluminum foil adding a conductive adhesive.

As shown in FIGS. 1A and 1E, the display device 1 further includes a plurality of first fixing elements F1 disposed corresponding to the second fixing elements F2. The first fixing elements F1 are located in the back plate 24. The side frame 12 can be fixed to the back plate 24 by connecting the first fixing elements F1 to the second fixing elements F2. In this embodiment, the first fixing elements F1 can be studs, and the second fixing elements F2 can be screws corresponding to the studs. To be noted, this invention is not limited thereto. Since the side frame 12 is made of metal or metal alloy and has electric conductivity, the static electricity can be conducted to the back plate 24 through the shielding element 15 and the side frame 12. Accordingly, the display device 1 can provide an anti-electrostatic discharge (AESD) function.

In addition, the display device 1 further includes an insulation element 16 for prevent the short circuit between the touch wiring layer T2 of the touch layer T and the shielding element 15. The insulation element 16 is disposed on the second substrate 212 and is located between the touch wiring layer T2 and the shielding layer 15.

Figure 2:
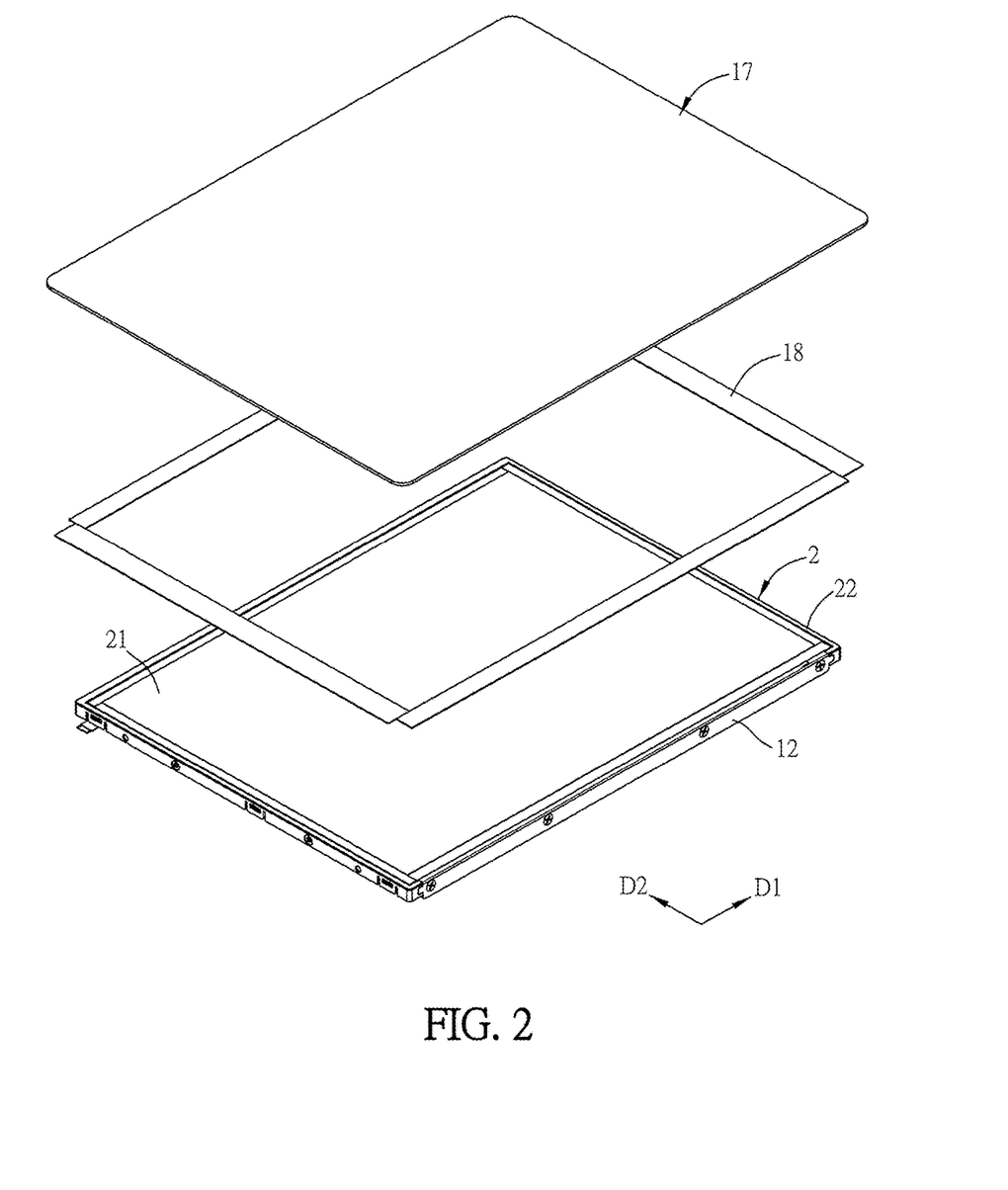
FIG. 2 is a schematic diagram showing another display device according to the embodiment of the disclosure.
Figure 3:
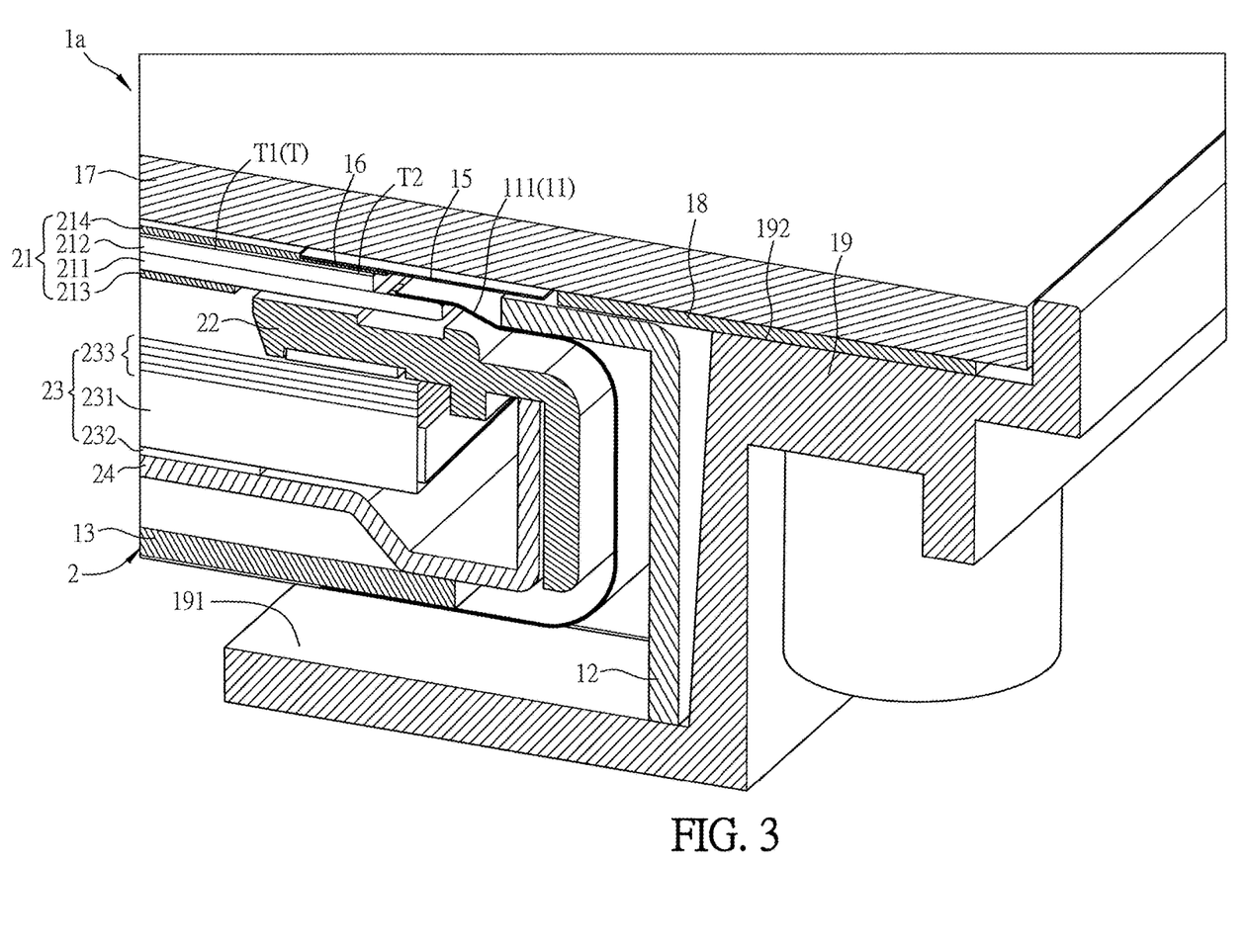
FIGS. 3 and 4 are schematic diagrams showing different aspects of the display device according to the embodiment of the disclosure.

As shown in FIG. 2, the display device further includes a protection element 17 disposed on the display module 2 and connected to the frame housing 22 and the side frame 12. For example, the protection element 17 is a protection glass. If the protection element 17 is directly attached to the frame housing 22, the bonding strength and planarity between the protection element 17 and the frame housing 22 are decreased since the contact portion between the protection element 17 and the frame housing 22 is relatively small due to the configuration of the recess U formed on the top surface of the first side S1 of the frame housing 22. This will also decrease the reliability of the display device 1. According to some embodiments, as shown in FIG. 3, the side frame 12 is connected to the first side S1 of the frame housing 22 so as to cover the connecting circuit board 11, the recess U and the first side S1. The protection element 17 is connected to the frame housing 22 (and the side frame 12) through an adhesive element 18 (e.g. edge lamination). Since the top surface of the side frame 12 and the top surfaces of the second sides S2 of the frame housing 22 are substantially located at the same plane, the bonding strength and planarity between the protection element 17 and the frame housing 22 are improved, thereby improving the reliability of the display device 1.

Figure 4:
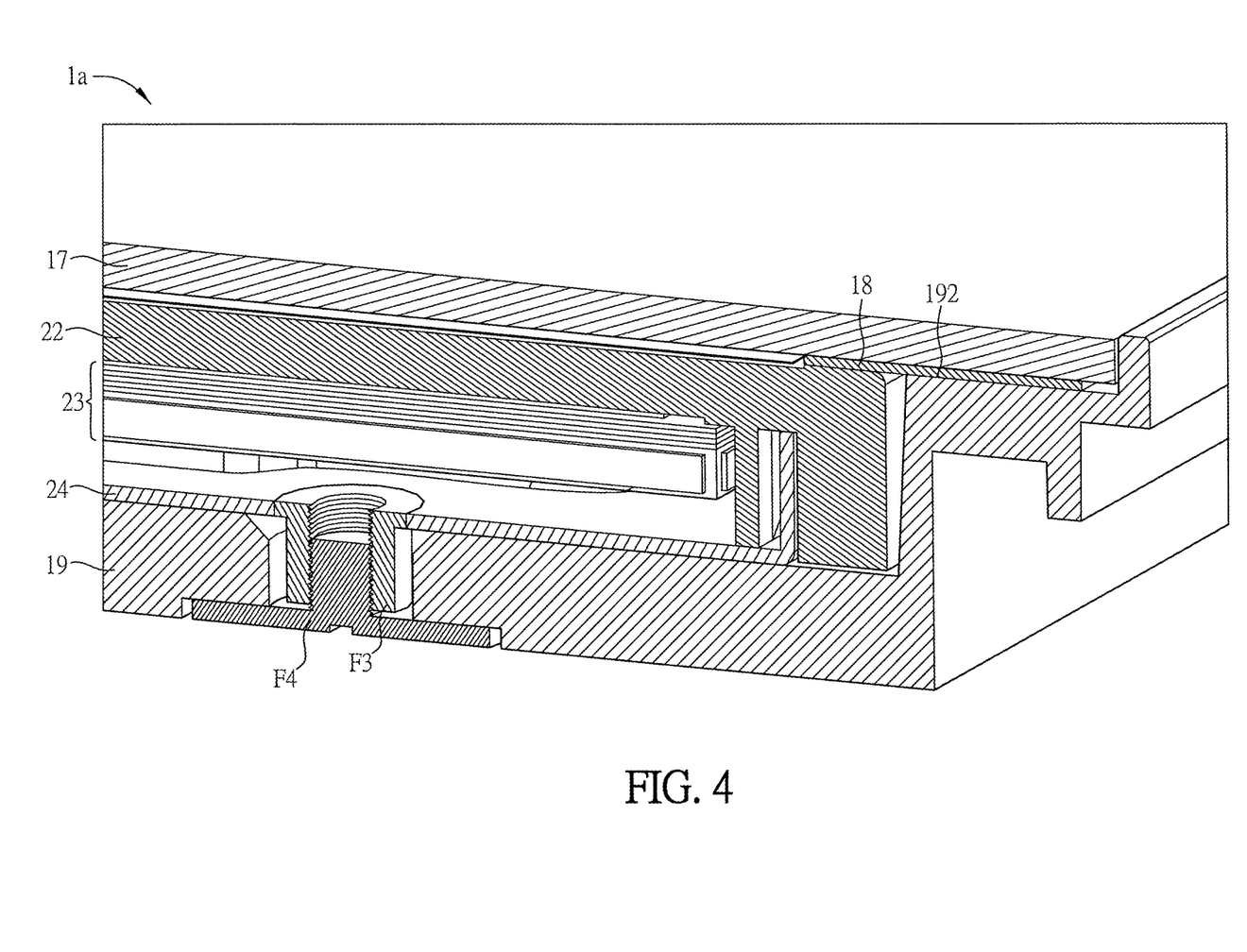

FIGS. 3 and 4 are schematic diagrams showing different aspects of a display device 1a according to the embodiment of the disclosure.

Most components and structures of the display devices 1 and 1a are the same. Different from the display device 1, the display device 1a further includes an outer frame 19 disposed at the outer peripheries of the display module 2 and the protection element 17 and connected to the display module 2 and the protection element 17. The outer frame 19 has a first supporting portion 191 for supporting the display module 2 and the side frame 12, and a second supporting portion 192 for supporting the protection element 17. The adhesive element 18 (e.g. edge lamination) is disposed between the second supporting portion 192 and the protection element 17. Thus, the protection element 17 can be fixed on the second supporting portion 192 of the outer frame 19 through the adhesive element 18. In other embodiments, the adhesive element 18 can further extend from the second supporting portion 192 to the place between the display module 2 and the protection element 17. For example, the adhesive element 18 may extend to the place between the frame housing 22 and the protection element 17 or the place between the second substrate 212 of the display panel 21 and the protection element 17, and this invention is not limited. In other embodiments, the outer frame 19 can be connected to the back plate 24 of the display module 2 by screwing or wedging. As shown in FIG. 4, the display device 1a further includes a third fixing element F3 and a fourth fixing element F4. The third fixing element F3 is disposed in the bottom of the back plate 24, and the outer frame 19 can be fixed to the back plate 24 by connecting the third fixing element F3 and the fourth fixing element F4. In this case, the third fixing element F3 can be a stud, and the fourth fixing element F4 can be a screw for screwing to the third fixing element F3.

The other technical features of the display device 1a can be referred to the same components of the display device 1, so the detailed descriptions thereof will be omitted.

To be noted, in the assembling procedure of the display device 1a, at first, the display module 2 combined with the side frame 12 and the connecting circuit board 11 is placed on the first supporting portion 191 of the outer frame 19. In this assembling step, the first supporting portion 191 of the outer frame 19 can be fixed to the back plate 24 by screwing. Then, the second supporting portion 192 of the outer frame 19 is attached with an adhesive element 18, and the protection element 17 is correspondingly attached to the adhesive element 18. Thus, the protection element 17 can be fixed to the second supporting portion 192 by the adhesive element 18. Compared with the conventional art, according to some embodiments, the assembling procedure can have the following advantages: (a) only a single adhesive element 18 is enough; and (b) when fixing the outer frame 19 to the back plate 24 by screwing, the display panel 21 or the protection element 17 will not be damaged.

In summary, the connecting circuit board and the recess on the first side of frame housing are disposed corresponding to each other, and the connecting circuit board is connected to the display panel and passes through the recess. The side frame covers the connecting circuit board, the recess and the first side. According to some embodiments, when the protection element is assembled, since the side frame and the frame housing have top surfaces about the same level, the bonding strength and planarity between the protection element and the frame housing can be improved. Thus, the reliability of the display device can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display device, comprising:
   a display module having a display panel and a frame housing, wherein the frame housing supports the display panel and has a first side, the first side has an inner surface and an outer surface opposite to the inner surface, the outer surface is closer to the display panel, the inner surface is away from the display panel, and the outer surface has a recess;
   a connecting circuit board disposed corresponding to the recess, wherein the connecting circuit board is connected to the display panel, and the connecting circuit board passes through and covers the recess; and
   a side frame disposed at the first side and connected to the frame housing, wherein the recess faces the side frame in a direction, the side frame covers the connecting circuit board, the recess and the first side, and the side frame is fixed on the first side by a fixing element.

2. The display device of claim 1, wherein the side frame is made of metal or metal alloy.

3. The display device of claim 1, wherein the frame housing further has three second sides, and a top surface of the side frame and top surfaces of the second sides are located on the same plane.

4. The display device of claim 3, further comprising:
   a protection element disposed on the display module and connected to the frame housing and the side frame.

5. The display device of claim 1, wherein the display panel has a first substrate and a second substrate, which are disposed opposite to each other, and the connecting circuit board is connected to the first substrate or the second substrate.

6. The display device of claim 1, wherein the display panel further comprises a first substrate and a second substrate, which are disposed opposite to each other, and the display device further comprises:
   a touch layer disposed on the second substrate and electrically connected to the connecting circuit board, wherein the touch layer comprises a touch wiring layer located in a non-touch area.

7. The display device of claim 6, further comprising:
   a shielding element disposed at peripheries of the display panel and the side frame.

8. The display device of claim 7, further comprising:
   an insulation element disposed between the touch wiring layer and the shielding element.

9. The display device of claim 4, further comprising:
   an outer frame connected to the display module and the protection element, wherein the outer frame has a first supporting portion for supporting the display module and the side frame, and a second supporting portion for supporting the protection element; and
   an adhesive element disposed between the second supporting portion and the protection element.

10. The display device of claim 9, wherein the adhesive element further extends from the second supporting portion to a place between the display module and the protection element.

* * * * *